INVENTOR
GEORGE JEROMSON,
BY Walter J. Adam
ATTORNEY.

INVENTOR.
GEORGE JEROMSON,
BY
Walter J. Adam
ATTORNEY.

United States Patent Office 3,188,632
Patented June 8, 1965

3,188,632
OBSTACLE CLEARING SYSTEM
George Jeromson, Sherman Oaks, Calif., assignor to Hughes Aircraft Company, Culver City, Calif., a corporation of Delaware
Filed Mar. 1, 1961, Ser. No. 92,708
9 Claims. (Cl. 343—11)

This invention relates to radar obstacle clearance systems and particularly to a simplified and highly reliable obstacle indication and clearance system.

Prior art terrain avoidance systems generally sweep the area in front of a moving craft in an azimuth direction and develop signals representing the elevation angle and the range of objects in front of the craft to determine the presence of obstacles above a clearance plane selected below the craft. Signals intercepted by the antenna containing the angle and range information are applied to a computer which determines the height of objects relative to the clearance plane. The radar return signals received from objects above this reference height are then applied to a display device. Because of the required angular measurements, a relatively complex computer is required in the prior art terrain avoidance systems.

It is therefore an object of this invention to provide a simplified obstacle clearance system that operates in a reliable manner without the measurement and computation of angular information.

It is a further object of this invention to provide a terrain avoidance system that utilizes a simpliled monopulse antenna and sum and difference channel arrangement for developing signals representative of the position and range of objects in front of the craft.

It is a still further object of this invention to provide a terrain clearance system that in response to gating of the sum and difference signals developed by a monopulse antenna, forms signals representative of the range of objects on the boresight axis of the antenna.

It is another object of this invention to provide an improved terrain clearance system that develops an indication of the angular position in azimuth and the range relative to that of a selected arc on a clearance plane, of objects in the path of a craft.

Briefly, this invention is an obstacle avoidance system to be utilized in a moving craft to indicate the range of objects relative to a fixed range on a clearance plane below the craft. A monopulse antenna arrangement sweeps through an azimuth scan angle at a fixed depression angle relative to the clearance plane and intercepts reflected pulses of energy to develop sum and difference signals in elevation angle monopulse mode. The sum and difference signals are then separately processed to form video sum and difference signals. The video difference signal is then applied to a pulse generator to develop pulses when the signal falls to a threshold level which may be at the null time of energy return on the boresight axis of the antennna lobes. A null determining gate is provided to respond to the presence of the sum signal above a threshold level and the pulse representing the null time of the different signal to develop a control signal. A display arrangement responds to the control signal and to deflection signals synchronized with the horizontal scan of the antenna to indicate the range and angular position of objects in the path of the craft and to indicate the range of objects relative to the fixed range determined by the clearance plane and the depression angle of the antenna.

The novel features which are believed to be characteristic of the invention both as to its organization and method of operation, together with further objects and advantages thereof, will be better understood from the following description considered in connection with the accompanying drawings, in which like characters refer to like parts, and in which.

Figure 1:
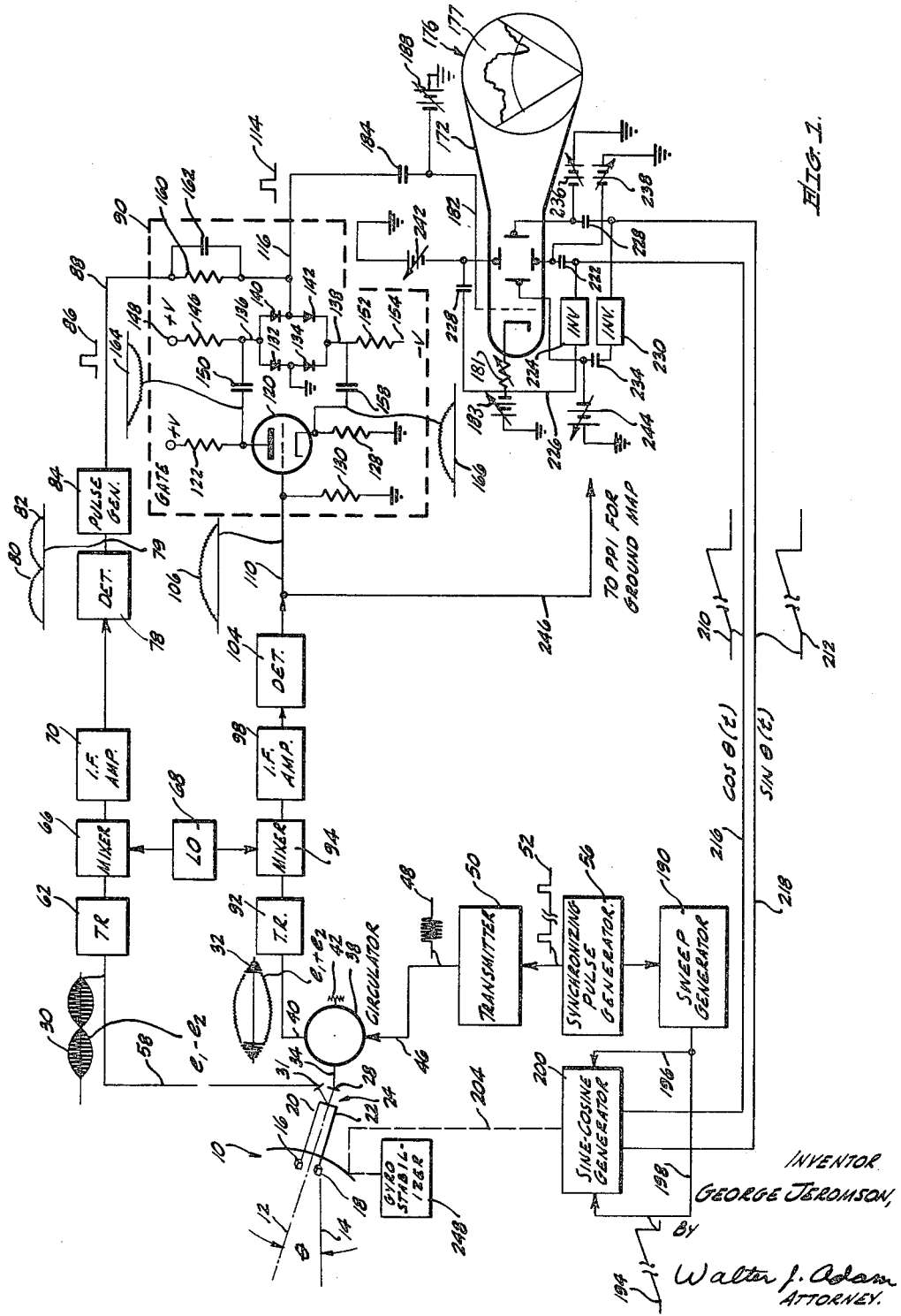
FIG. 1 is a schematic block and circuit diagram showing the obstacle clearance system in accordance with this invention.

Referring first to the system in accordance with this invention shown in FIG. 1, a monopulse antenna 10 sweeps horizontally through an azimuth sweep angle $\theta$ which is both positive and negative relative to longitudinal axis or velocity vector 14 of a craft. The antenna 10 operates in an elevation angle monopulse mode with two horns 16 and 18 vertical to each other in an elevation plane. It is to be noted that within the principles of the invention a slot array may also be utilized instead of horns 16 and 18 illuminating a reflector. The horns 16 and 18 apply intercepted RF (radio frequency) energy to branches 20 and 22 of a magic T structure or waveguide junction 24 for energy division. Energy received by the magic T structure 24 is applied to a junction 28 as an elevation sum signal indicated by a waveform 32 and to a junction 31 as an elevation difference signal indicated by a waveform 30. The junction 28 is coupled through a lead 34 to a circulator 38 which, as is well known in the art, applies the sum signal of the waveform 32 with minimum attenuation to an adjacent lead 40. The circulator 38 includes an input lead 42 which is terminated with a suitable load and an input lead 46 to which is applied pulses of energy of a waveform 48 from a transmitter 50 for being applied with minimum attenuation through the circulator 38 to the lead 34. The pulses of energy are then applied through the magic T structure 24 and to the horns 16 and 18 without a phase shift for transmission into space. The transmitter 50 is controlled by synchronizing pulses of a waveform 52 having a selected pulse repetition frequency (PRF) and applied thereto from a synchronizing pulse generator 56.

The difference signal of the waveform 30 developed from energy intercepted by the antenna 10 is applied from the junction 31, through a lead 58 and through a transmit-receive or TR box 62 that functions as an antenna duplexer, as is well known in the art, to a mixer 66. A local oscillator 68 is coupled to the mixer 66 to heterodyne the RF energy of the waveform 30 to an IF (intermediate frequency) signal which is then applied in turn through an IF amplifier 70 to an amplitude detector circuit 78.

The amplitude detector 78 develops a rectified envelope signal or video difference signal shown by a waveform 80 which has a null time 82 at which the signal falls to a threshold or reference level representing the time of energy return on the boresight axis 12 of the antenna 10. The video difference signal of the waveform 80 is then applied to a pulse generator 84 which responds at the null time 82 to develop a pulse shown by a waveform 86. The pulse generator 84 may be any conventional arrangement responsive to a voltage level such as at the null time 82 to develop a pulse and may include a trigger type saturable blocking oscillator responsive to the fall of potential to the reference level to develop a relatively narrow pulse. It is to be noted at this time the pulse generator 84 may also develop pulses shown by the waveform 86 when the video difference signal of the waveform 80 falls to the low level because of the absence of a signal. The pulses such as shown by the waveform 86 are then applied through a lead 88 to a gating circuit or gate 90.

The sum signal indicated by the waveform 32 at radio frequency is applied from the lead 40 to a TR box 92 similar to the TR box 62, and is applied to a mixer 94 controlled by the local oscillator 68. The mixer 94 heterodynes the RF sum signal to an IF sum signal which is applied in turn to an IF amplifier 98. The amplified IF sum signal is applied from the IF amplifier 98 to an amplitude detector circuit 104 which develops a rectified envelope or video sum signal indicated by a waveform 106 on a lead 110, which signal is then applied to the gate 90. The amplitude detector circuits 78 and 104 may provide suitable amplification to the video signals of the waveforms 80 and 106.

Energy is returned on the boresight axis 12 of the antenna 10 at the time when the video difference signal of the waveform 80 is at the null time 82 to develop a pulse of the waveform 86, and the video sum signal of the waveform 106 has a substantially large amplitude as will be explained in further detail subsequently. The gate 90 responds to the condition of the appearance of a pulse of the waveform 86 simultaneously with the presence of a sum signal above a selected reference amplitude to apply a pulse of a waveform 114 to a control lead 116. The gate 90 includes a tube 120 having an anode coupled through a resistor 122 to a source of positive voltage 124 and a cathode coupled through a resistor 128 to ground. The grid of the tube 120 is coupled to the lead 110 as well as through a biasing resistor 130 to ground. A diode switching arrangement includes diodes 132 and 134 having anode to cathode paths coupled in series between leads 136 and 138 and diodes 140 and 142 also having anode to cathode paths coupled between the leads 136 and 138. The lead 136 is coupled through a resistor 146 to a source 148 of positive voltage as well as being coupled to the anode of the tube 120 through a coupling capacitor 150. The lead 138 is coupled through a resistor 152 to a source 154 of negative voltage as well as to the cathode of the tube 120 through a coupling capacitor 158. The signal of the waveform 86 is applied from the lead 88 through a resistor 160 and parallel coupled bypass capacitor 162 to a lead 116 coupled between the diodes 140 and 142. The cathode of the diode 132 is coupled to ground.

In operation of the gate 90, the tube 120 is normally biased out of conduction and the diodes 132, 134, 140 and 142 are forward biased so that pulses of the waveform 86 are shorted to ground at the cathode of the diode 132. When the video sum signal of the waveform 106 arises to a selected reference or threshold level to bias the tube 120 into conduction, signals of waveforms 164 and 166 are respectively applied to leads 136 and 138 to bias the diodes 132, 134, 140 and 142 out of conduction. Thus, during the occurrence of a portion of the video sum signal of the waveform 106, that is, when the video sum signal is above a threshold voltage level, pulses of the waveform 86 which are representative of the null time 82 of the video difference signal of the waveform 80 are applied to the lead 116 as control pulses shown by the waveform 114. A display circuit 172 which may be a conventional planned position indicator (PPI) arrangement responds to the control pulses of the waveform 114 on the lead 116.

The display arrangement 172 may include a conventional cathode ray tube 176 having a phosphor coated screen 177 and having a cathode coupled through a variable resistor 181 to the negative terminal of a variable battery 183, the positive terminal of which is coupled to ground. The tube 176 has a control grid which may be the intensity grid coupled through a lead 182 and in turn through a coupling capacitor 184 to the lead 116. Also, for providing adjustable D.C. (direct current) biasing, the lead 182 is coupled to a suitable biasing arrangement such as to the negative terminal of a variable battery 188, the positive terminal of which is coupled to ground.

To provide deflection signals to the tube 176, a sweep generator 190 applies a sweep signal of a waveform 194 through leads 196 and 198 to a sine-cosine generator 200. The azimuth scan movement of the antenna 10 through the scan angle plus and minus $\theta$ is translated through a suitable mechanical connection 204 to the sine-cosine generator 200 so that sweep signals shown by waveforms 210 and 212 are developed on respective leads 216 and 218. The sweep signals of the waveforms 210 and 212 represent a product of the linear sweep voltage of the waveform 194 and respectively the $\cos \theta$ and the $\sin \theta$ for sequential values of $\theta$ during the azimuth sweep. It is to be noted that the signals of the waveforms 194, 210 and 212 are shown out of scale from the other waveforms of FIG. 1 for convenience of illustration.

Thus, the deflection signals of the waveforms 210 and 212 are time functions proportional to $\cos \theta$ and $\sin \theta$ with $\theta$ being substantially constant during each sweep as the repetition frequency of the pulses of the waveform 52 is substantially greater than the scan rate of the antenna 10. The sine-cosine generator may be a conventional arrangement such as the sine-cosine potentiometer shown on page 451 of volume 22 of the Radiation Laboratory series entitled "Cathode Ray Tube Displays."

The deflection signal of the waveform 210 is applied from the lead 216 through a coupling capacitor 222 to a first vertical deflection plate of the tube 176 and to an inverting circuit 224. An inverted signal is applied from the inverting circuit 224 to a lead 226 and through a coupling capacitor 228 to a second vertical deflection plate of the tube 176. The deflection signal of the waveform 212 is applied from the lead 218 through a coupling capacitor 228 to a first horizontal deflection plate of the tube 176. Also, the deflection signal of the waveform 212 is applied to an inverting circuit 230 and applied as an inverted signal through a coupling capacitor 234 to a second horizontal deflection plate of the tube 176.

Suitable biasing arrangements for the deflection plates of the tube 176 may include a variable source of potential such as indicated by variable batteries 236 and 238 coupled respectively to the first vertical and horizontal deflection plates of the tube 176 and as indicated by variable batteries 242 and 244 coupled to respective second vertical and horizontal deflection plates of the tube 176.

For a conventional PPI map display a lead 246 coupled to the lead 110 may be utilized to apply the video sum signal of the waveform 106 to the intensity grid of the tube 176. It is to be noted that the display arrangement 172 may be varied within the principles of the invention such as by applying the control pulse of the waveform 114 to the cathode of the tube 176.

As will be discussed subsequently, the antenna 10 may be fixed at a constant depression angle below the axis of the craft for one mode of operation or in another mode of operation may be maintained at a constant depression angle below the horizontal by a conventional gyro stabilizer 248 mounted to the structure of the antenna 10.

Figure 2:
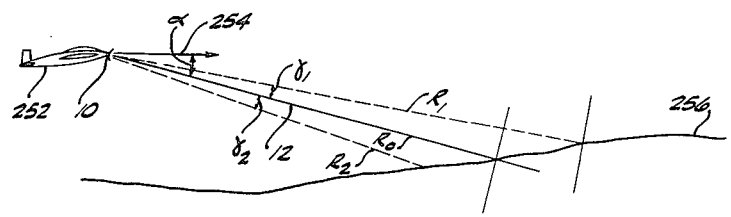
FIG. 2 is an elevation view of a craft in flight to explain the energy return from the upper and lower lobes of the antenna beam of the system of FIG. 1.
Figure 3:
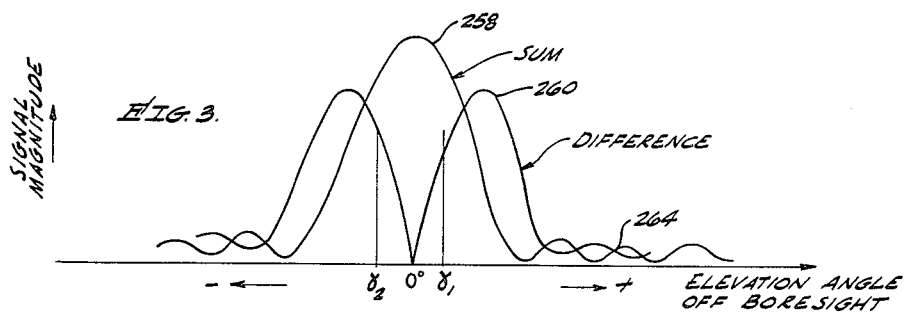
FIG. 3 is a diagram showing the sum and difference energy magnitude versus elevation angle off boresight for explaining the operation of the system of FIG. 1.

For further explaining the operation of the system in accordance with this invention, a craft 252 of FIG. 2 is moving in a direction indicated by a velocity vector 254 with the antenna 10 fixed so the boresight axis 12 is at a constant depression angle $\alpha$ below the path of the craft 252. Transmitted pulses of energy are returned to the antenna 10 from different ranges such as range $R_1$ from a point on the terrain 256 at an angle $\gamma_1$ above the boresight line 12 and as range $R_2$ at an angle $\gamma_2$ below the boresight line 12. The magnitude of the energy return in the sum channel at the lead 40 is shown by a curve 258 of FIG. 3 and the magnitude of the energy return in the difference channel is shown by a curve 260 as a function of the angle $\gamma$ from the boresight axis 12. At the angles $\gamma_1$ and $\gamma_2$ the sum signal of the curve 258 and the difference signal of the curve 260 have a substantially large amplitude. At the boresight axis, that is, when the angle $\gamma$ off boresight is 0 degrees, the difference energy is at a null point, and a substantially large sum signal of the waveform 258 is present. It is to be noted that at the angular position of the side lobes such as 264, a substantially zero difference signal is present but the sum signal has a relatively low amplitude. Thus, in the system of the invention, the range $R_0$ at which the energy return from the ground 256 is along the boresight axis 12 is determined by the condition of a null of the difference signal of the curve 260 and the presence of a substantially large sum signal indicated by the curve 258.

Figure 4:
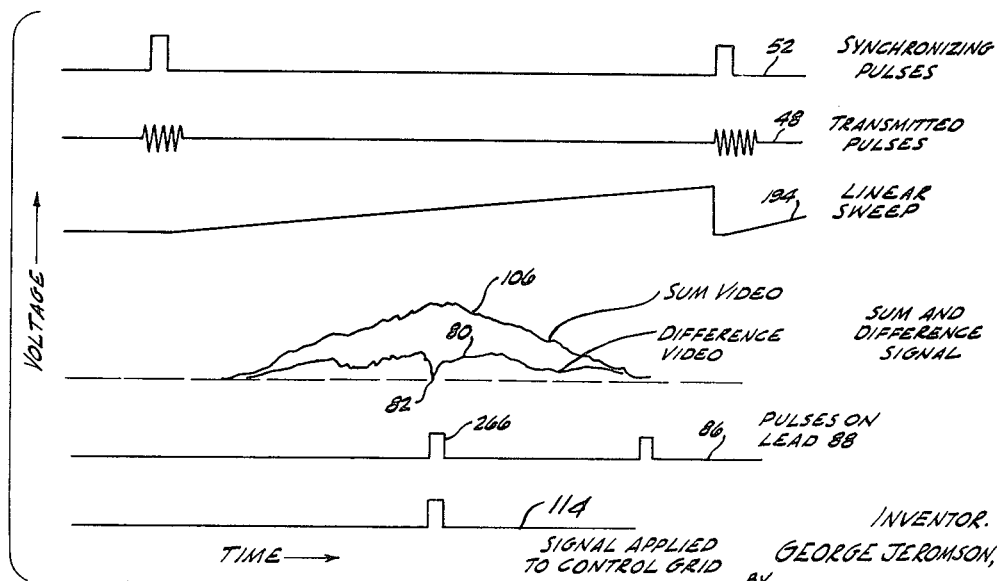
FIG. 4 is a voltage versus time diagram of waveforms for explaining the operation of the system of FIG. 1.

Referring now to the waveforms of FIG. 4 as well as to FIG. 1 for further explaining the system operation, the synchronizing pulses of the waveform 52 are applied to the transmitter 50 which responds to develop pulses of the waveform 48 which are applied through the circulator 38 and the magic T structure 24 to the horns 16 and 18 for transmission as a pencil beam into space. Return energy is intercepted by the feed apertures or horns 16 and 18 of the elevation angle monopulse antenna 10 and applied to the magic T structure 24 and to the leads 34 and 40 as a sum signal $e_1+e_2$ of the waveform 32 where $e_1$ and $e_2$ respectively represent the signals received from the horns 16 and 18. The sum signal of the waveform 32 has an amplitude variation with elevation angle indicated by the curve 258 of FIG. 3 and an amplitude variation with time similar to the video sum signal of the waveform 106 except at radio frequency. The intercepted energy is also applied to the lead 58 as a difference signal $e_1-e_2$ of the waveform 30 with an amplitude variation with elevation angle as shown by the curve 260 and variation with time similar to the video difference signal of the waveform 80 except at radio frequency and unrectified.

The sum signal of the waveform 32 is then applied through the mixer 94 and heterodyned to an IF signal which is applied to the amplitude detector 104 to develop the video sum signal of the waveform 106 on the lead 110. Simultaneously, the difference signal of the waveform 30 is applied to the mixer 66 and heterodyned to an IF signal which is applied to the amplitude detector 78 to develop the video difference signal of the waveform 80 on the lead 79. The pulse generator 84 responds to the potential level at the null time 82 and other decreases in amplitude of the video difference signal of the waveform 80 such as at the time of termination of the signal to apply pulses of the waveform 86 to the lead 88.

During the time of occurrence of a pulse 266 of the waveform 86, the gate 90 is closed to apply the pulse as shown by the waveform 114 to the control grid of the tube 176 to provide a brightening of the display. Also, during each interval between the synchronizing pulses of the waveform 52 a linear sweep voltage of the waveform 194 is developed and combined with the sine and cosine of the angle $\theta$ which is substantially constant during each pulse period of the waveform 52. For example, the pulse repetition frequency of the waveform 52 may be 3200 pulses per second and the total azimuth sweep of the antenna 10 may be 100 angular degrees and at a rate of one sweep per second.

Figure 5:
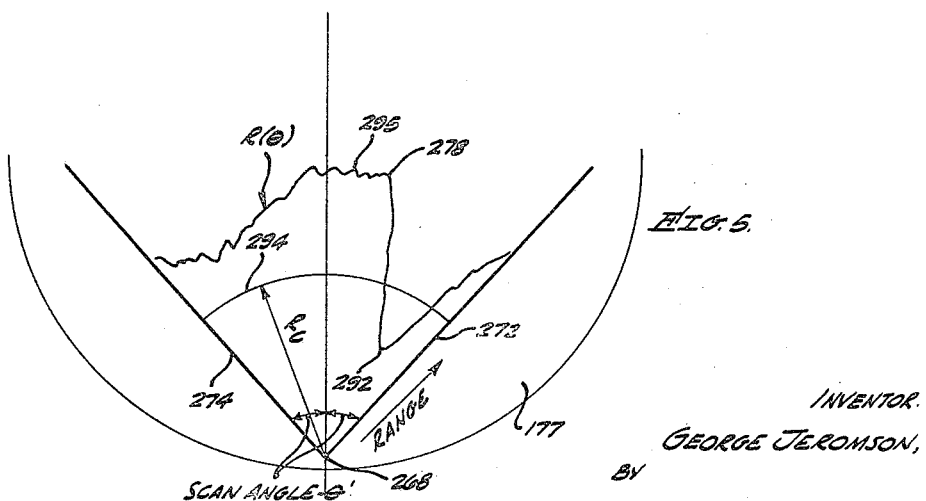
FIG. 5 is a diagram of the screen of the display tube of FIG. 1 for further explaining the operation of the system in accordance with this invention.

Thus, the deflection signals of the waveforms 210 and 212 related to each other by the cosine and sine of the angle $\theta$ are applied to the vertical and horizontal deflection plates of the tube 176. As shown in FIG. 5, the beam of the tube 176 sweeps from a point 268, determined by the biasing arrangement such as the variable batteries 238 and 242, in a radial direction on the screen 177 within the lines 272 and 274 during each pulse interval of the waveform 52. At the termination of each sweep of the waveform 194, conventional means (not shown) may be provided to apply a blanking pulse to the tube 176 such as to the cathode thereof. During each pulse interval of the waveform 52 over the entire scan angle $\pm \theta'$, the electron beam of the tube 176 sweeps radially from the point 268 with each sweep at an increasing angle from the line 272 to the angle $-\theta'$ and then at an increasing angle from the line 274 to the angle $+\theta'$. As determined by the biasing of the control grid of the tube 176, only during the application of a pulse of the waveform 114 is the potential level applied to the lead 182 sufficient for a visible indication to be shown by a line 278. Because the time of occurrence of the pulse of the waveform 114 indicates the time of return or range of energy returned on the boresight axis 12, the indication 278 on the screen 177 shows range as the radial distance from the point 268 at various angular positions over the scan angle $\theta'$.

Figure 6:
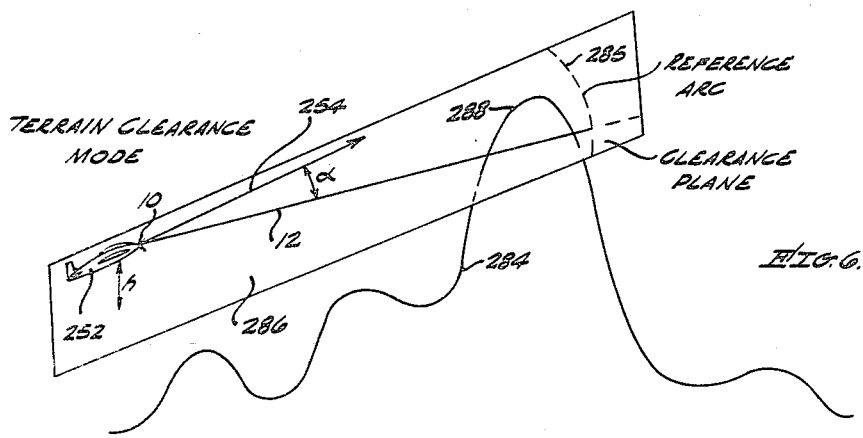
FIG. 6 is a perspective view of a craft in flight for explaining the operation in a terrain clearance mode of the system of FIG. 1.

Before further explaining the display of FIG. 5 the diagram of FIG. 6 shows the vehicle or craft 252 operating in a terrain clearance mode with the system in accordance with this invention and with the boresight axis 12 of the antenna 10 at a fixed angle of depression $\alpha$ below the velocity vector 254. Thus, the gyro stabilizer 248 of FIG. 1 is deenergized so that the antenna 10 is vehicle oriented at the fixed depression angle $\alpha$ during the continuous azimuth sweeps. The terrain clearance mode has the advantage that for moving at a low elevation relative to the ground 284, for example, the pilot has a direct indication of obstacles in his path.

The boresight line 12 sweeping in a horizontal direction through the angle $\pm \theta$ cuts a circular arc 285 through a selected horizontal plane 286 parallel to the velocity vector 254 and at a clearance distance $h$ below the craft 252. When the boresight line 12 cuts the arc 285 at a range greater than an obstacle such as 288, the display indication 278 appears as shown at 292 below a reference arc 294. It is to be noted that the reference arc 294 may be a light colored line engraved on the screen 177 at a radius from the point 268 determined from the height $h$ of the selected clearance plane 286 and the angle of depression $\alpha$.

When an obstacle (not shown) is in the path of the transmitted energy at a range beyond the reference arc 285, the line 278 on the screen 177 such as at 295 is above the reference arc 294 indicating to the pilot that in that azimuth position the obstacles are further in range than the reference arc 285. It is to be noted that when the craft 252 was in a previous position than that shown in FIG. 6, the obstacle 288 is indicated such as at 295 above the reference arc 294 as the arc 285 is in a position in front of the obstacle 288. Thus, the system displays obstacles relative to a fixed range as determined by the selected height $h$ and depression angle $\alpha$. For example, if the craft 252 has slow maneuverability, the angle $\alpha$ is selected relatively small.

When an obstacle has an elevation below the clearance plane 286, no indication thereof is provided on the screen 177 after the craft moves so that the obstacle is within the range to the arc 285. Because elevation information of the obstacles is not provided, it is possible for $R(\theta)$ which is the range indicated by the line 278 to be less than $R_c$ which is the range indicated to the reference arc 294 and still not represent a hazard. For example, energy may be reflected on the boresight line 12 from an object closer to the craft 252 than the arc 285 but which has a peak elevation below the craft 252. However, this condition does not affect the safe operation of the system because the indication on the screen 177 is to avoid the obstacle by the craft. An important feature is that on a selected flight path, a collision can ever occur during the time the craft travels over a range $R(\theta)$ if, at the beginning of the travel over that range, $R(\theta)$ is greater than $R_c$ in the heading direction of the craft, that is, when an obstacle, which may or may not be a potential hazard, is indicated above the reference arc 294. Also, the operator employing the display of FIG. 5 can be confident that a potential hazard will always appear on the screen 177 below the reference arc 294. It is to be noted that, as the craft 252 moves close to an object that is above the clearance plane 286 but below the flight path, it may not appear as an indication on the screen 177, but the craft cannot collide as long as the flight path is not varied downward more than the depression angle $\alpha$.

Thus, by a direct indication, the pilot can determine the azimuth course to follow to avoid obstacles. When the craft 252 changes elevation angle the line 278 moves so that the pilot may determine the necessary rate of climb to clear obstacles. Therefore, the line 278 provides a direct indication of range as a function of the scan angle $\theta$ relative to the reference arc 294 to indicate obstacles to be avoided.

Figure 7:
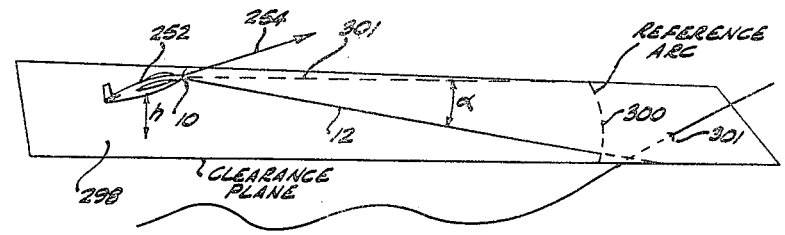
FIG. 7 is a perspective view of a craft in flight for explaining the operation in a contour mapping mode of the system of FIG. 1.

When operating in a contour mapping mode as shown in FIG. 7, the craft 252 has a horizontal clearance plane 298 at a height $h$ below the craft with the antenna 10 (FIG. 1) controlled by the operation of the gyro stabilizer 248 so that the boresight axis 12 is maintained at a fixed depression angle $\alpha$ below the horizontal. Thus, the angle of depression $\alpha$ between a horizontal line 301 and the boresight axis 12 remains constant even when the velocity vector 254 changes in elevation as the craft maneuvers. The boresight axis 12 forms the circular arc 300 in the horizontal clearance plane 298. Similar to the arrangement of FIG. 6, the reference arc 294 on the screen 177 indicates the range of obstacles such as 301 relative to the arc 300 in the horizontal clearance plane 298 which is at the selected distance $h$ below the craft 252. When the arc 300 is in the position shown, an indication such as at 295 for a particular azimuth angle on the screen 177 shows that no obstacles are present at that azimuth angle within the range $R_c$ as determined by the height $h$ and the depression angle $\alpha$. However, as discussed above, when the craft 252 moves forward so as to be within the selected range limit of the obstacle, the obstacle 301 which extends above the plane 298 will be indicated by the line 278 changing to a position below the reference arc 294. If the obstacle 301 did not extend above the clearance plane, there would be no indication thereof after the craft 252 moved so that the obstacle 301 was within the range $R_c$. Also, similar to the discussion in reference to FIG. 6 the operator of the craft 252 may be confident that any hazardous obstacle will ultimately appear on the screen 177 below the reference arc 294 and that for a range $R(\theta)$ no obstacles are in the path of the craft when the line 278 is displayed above the reference arc 294. It is to be noted that the contour mapping mode of operation is desirable when a reliable contour indication of the obstacles in the path of the craft are desired regardless of changes of elevation angle of the craft 252.

Thus, the system of FIG. 1 determines bearings to objects on the boresight axis without radar azimuth monopulse determination, that is, by an amplitude detecting system. Because angles are not measured as in conventional monopulse systems, phase and amplitude balancing problems between the two channels from the leads 40 and 58 are substantially eliminated. It is to be noted that the principles of the invention are applicable to automatic terrain or obstacle avoidance by generating alert or steering signals when $R(\theta)$ as shown in FIG. 5 minus $R_c$ is less than 0 in the heading direction of the craft.

Although only one mechanization of the principles of the obstacle avoidance system has been described in FIG. 1, other arrangements may be utilized in accordance with the principles of this invention. For example, the difference energy may be applied to a ferrite modulator to form a modulated difference signal which is then applied to a coupling arrangement to be combined with the sum signal to develop an alternating signal. The modulation of the alternating signal represents both the sum plus difference energy and the sum minus difference energy. The alternating signal is then applied through a mixer, an amplifier and an amplitude detector to form a video signal containing percentage of modulation information representative of the angle between the line of sight of the ground element and the antenna boresight axis. The video signal is then applied to a gating arrangement and to the control grid of an indicating arrangement such as described above, with the point of zero percentage of modulation of the video signal providing an indication of the boresight axis.

Thus, there has been described an obstacle or terrain avoidance system that determines the range of objects on the boresight axis of the antenna without elevation angular measurements or computed information. The system operates with a simple gating or comparison of the sum and difference signal. An advantage of the system is that the sum and difference channels do not have the critical balancing problems of conventional monopulse systems. The indicator which may be of the PPI type provides a direct display of angular bearing to potential obstacles and the range of the potential obstacles relative to a reference range $R_c$ in a clearance plane below the craft.

What is claimed is:

1. An obstacle indicating system operable in a craft comprising an elevation angle monopulse antenna mounted on said craft and having first and second horns mounted vertical to each other, said antenna having a stabilizer and a boresight axis maintained at a predetermined depression angle relative to a horizontal clearance plane selected at a predetermined distance below the craft, said antenna scanning a selected azimuth angle, energy dividing means coupled to the first and second horns of said antenna, transmitting means coupled to said energy dividing means for applying pulses of energy at radio frequency to said horns for transmission to the obstacles, said energy dividing means responding to reception of return energy by said horns to develop sum and difference signals at radio frequency, first and second mixing means coupled to said energy dividing means for respectively responding to said sum and difference signals at radio frequency to develop sum and difference signals at intermediate frequency, first and second amplitude detecting means respectively coupled to said first and second mixing means for developing video sum signals and video difference signals, said video sum signals and video difference signals having amplitude characteristics representative of said boresight axis, pulse generating means coupled to said second amplitude detecting means for developing first pulses in response to said video difference signal falling to a predetermined amplitude, gating means coupled to said pulse generating means and to said first amplitude detecting means to respond to said first pulses and to said video sum signal increasing to a predetermined amplitude to develop a second pulse representative of the time of reception of energy on said boresight axis, cathode ray tube display means having deflection plates and having a control grid coupled to said gating means, said display means having a screen with a reference arc thereon representing a fixed slant range along said boresight axis from said antenna to said clearance plane, sweep generating means coupled to said transmitting means, deflection signal generating means coupled to said sweep generating means and to said antenna for responding to the azimuth angle thereof to develop deflection signals, and means coupling said deflection signal generating means to said deflection plates, said display means over said selected azimuth scan angle developing an indication of the slant range to obstacles on said boresight axis relative to the slant range to said clearance plane as indicated by said reference arc.

2. A system for determining the azimuth bearing and slant range of ground objects from a craft and for determining the slant range of the objects relative to a predetermined slant range to a horizontal clearance plane at a selected distance below the craft and parallel to the velocity vector of the craft comprising an elevation angle monopulse antenna mounted on said craft and maintained at a predetermined depression angle relative to said clearance plane, said antenna scanning in an azimuth direction over a predetermined scan angle, energy coupling means coupled to said antenna, transmitting means coupled to said energy coupling means for applying pulses of energy to be transmitted toward the objects, said energy coupling means responding to energy received from said objects to form sum and difference energy having amplitude characteristics representative of the angle of energy return in the elevation plane, first and second mixing means coupled to said energy coupling means for respectively responding to said sum and difference energy to develop intermediate frequency sum and difference signals, first and second amplitude detecting means respectively coupled to said first and second mixing means for developing video sum signals and video difference signals, said video difference signals having a first amplitude at the null time of energy return on said boresight axis, and said video sum signal having a second amplitude during a time including the time of energy return on said boresight axis, a pulse generator coupled to said second amplitude detecting means, gating means coupled to said pulse generator and to said first amplitude detecting means for developing a control pulse at the null time of said video difference signal, a display tube having a control grid coupled to said gating means and having deflection plates and a screen, deflection signal forming means coupled to said antenna and to said deflection plates, said screen having reference arc thereon, said display tube responding to said control pulses to provide a slant range and scan angle indication of objects on said boresight axis with the position on said screen relative to said reference arc indicating the slant range relative to said predetermined slant range.

3. An obstacle display system for use with an aircraft comprising
means attached to said aircraft for transmitting electromagnetic energy into a region containing objects and for receiving reflections of said energy from said objects, said transmitting and receiving means including a monopulse antenna having a boresight axis, said antenna being movable in azimuth relative to said aircraft so that said boresight axis defines in space a range arc in a clearance plane a predetermined distance below the aircraft,
first signal forming means coupled to said antenna for responding to the received energy to form sum and difference signals of which the sum signal has substantially a maximum amplitude and the difference signal has substantially a minimum amplitude when the energy is received on said boresight axis,
second signal forming means coupled to said first signal forming means and responsive to said sum and difference signals for developing a control signal at a time representative of the time of energy reception on said boresight axis,
and display means coupled to said second signal forming means and to said transmitting and receiving means and having a screen, said display means responding to said control signal to provide an indication of the slant range and azimuth of said objects on said boresight axis, said screen having a fixed reference arc thereon positioned so that the indication of the slant range and azimuth of objects at a slant range greater than the distance between said antenna and said range arc is displayed on one side of said fixed arc, and the indication of the slant range and azimuth of objects above said clearance plane and at a slant range shorter than the distance between said antenna and said range arc is displayed on the other side of said fixed arc.

4. An obstacle display system for use with an aircraft comprising
means attached to said aircraft for transmitting electromagnetic energy into a region containing objects and for receiving reflections of said energy from said objects, said transmitting and receiving means including a monopulse antenna having a boresight axis, said antenna being attached to said aircraft so that said boresight axis remains at a predetermined angle below the velocity vector of said aircraft, said antenna being movable in azimuth relative to said aircraft so that said boresight axis defines in space a range arc in a clearance plane below the aircraft, said clearance plane being parallel to said velocity vector and at a predetermined constant distance from said aircraft,
first signal forming means coupled to said antenna for responding to the received energy to form sum and difference signals of which the sum signal has substantially a maximum amplitude and the difference signal has substantially a minimum amplitude when the intercepted energy is received on said boresight axis,
second signal forming means coupled to said first signal forming means and responsive to said sum and difference signals for developing a control signal representative of the time of energy reception on said boresight axis,
and display means coupled to said second signal forming means and to said transmitting and receiving means and having a screen, said display means being responsive to said control signal to provide an indication of the slant range and azimuth of said objects on said boresight axis, said screen having a fixed reference arc thereon positioned so that the indication of the slant range and azimuth of objects at a slant range greater than the distance between said antenna and said range arc is displayed on one side of said fixed arc, and the indication of the slant range and azimuth of objects above said clearance plane and at a slant range shorter than the distance between said antenna and said range arc is displayed on the other side of said fixed arc.

5. An obstacle display system for use with an aircraft comprising
means attached to said aircraft for transmitting electromagnetic energy into a region containing objects and for receiving reflections of said energy from said objects, said transmitting and receiving means including a monopulse antenna having a boresight axis and stabilizing means for maintaining said boresight axis at a predetermined angle below the horizontal, said antenna being movable in azimuth relative to said aircraft so that said boresight axis defines in space a range arc in a clearance plane below the aircraft, said clearance plane being a horizontal plane at a predetermined distance from said aircraft, first signal forming means coupled to said antenna for responding to the reflected energy to form sum and difference signals of which the sum signal has substantially a maximum amplitude and the difference signal has substantially a minimum amplitude when the received energy is reflected on said boresight axis, second signal forming means coupled to said first signal forming means and responsive to said sum and difference signals for developing a control signal at a time representative of the time of energy interception on said boresight axis, and display means coupled to said second signal forming means and to said transmitting and receiving means and having a screen, said display means being responsive to said control signal to provide an indication of the slant range and azimuth of said objects on said boresight axis, said screen having a fixed reference arc thereon positioned so that the indication of the slant range and azimuth of objects at a slant range greater than the distance between said antenna and said range arc is displayed on one side of said fixed arc, and the indication of the slant range and azimuth of objects above said clearance plane and at a slant shorter than the distance between said antenna and said range arc is displayed on the other side of said fixed arc.

6. A system operable with a moving craft to indicate the presence of objects in the path thereof comprising azimuth scan antenna means having first and second feed apertures in an elevation plane, said antenna means having a boresight axis in said elevation plane at a predetermined angle of depression relative to a horizontal clearance plane a predetermined distance below the craft to form a range arc in said horizontal clearance plane, said antenna means scanning through a predetermined azimuth angle, energy dividing means coupled to said first and second feed apertures, transmission means coupled to said energy dividing means for transmitting pulses of energy to the objects, said energy dividing means forming sum and difference signals in response to energy received after reflection from the objects, said sum and difference signals having amplitude characteristics representative of the time of energy return on said boresight axis, signal forming means coupled to said energy dividing means for responding to the amplitude characteristics of said sum and difference signals to develop a control signal representative of energy return on said boresight axis, and display means coupled to said signal forming means and to said transmission means and responsive to said control signal to provide an indication of the slant range and azimuth of said objects on said boresight axis, said display means having a fixed reference arc thereon which is so positioned that the indication of objects at a slant range greater than the distance between said antenna means and said range arc is displayed on one side of said fixed reference arc and the indication of objects above said clearance plane and at a slant range shorter than the distance between said antenna means and said range arc is displayed on the other side of said fixed reference arc.

7. An obstacle display system for an aircraft comprising elevation angle monopulse antenna means for developing a sum and a difference signal in response to energy received from objects, said antenna means having a boresight axis and scanning said boresight axis in azimuth, said boresight axis defining a range arc in a clearance plane below the craft, first and second channels coupled to said antenna means for respectively developing a video sum and a video difference signal, said video sum signal having a substantially maximum amplitude and said video difference signal having a substantially minimum amplitude in response to energy received on said boresight axis, signal forming means coupled to said first and second channels for developing a control signal representative of the time of reception of energy on said boresight axis, and display means coupled to said antenna means and coupled to said signal forming means for responding to said control signal to provide an indication of the slant range and azimuth of objects on said boresight axis from which energy is received, said display means having a reference arc thereon representative of a fixed slant range from said antena means to said range arc, indications of said objects being on one side of said reference arc when the object is at a slant range greater than the distance between said antenna means and said range arc and being on the other side of said reference arc when the object is above said clearance plane and at a slant range shorter than the distance between said antenna means and said range arc.

8. A system for indicating the slant range of objects in front of a moving craft relative to a predetermined range to a clearance plane passing a selected distance below the craft comprising transmitter means, an azimuth scan monopulse antenna for scanning at a predetermined depression angle below the axis of the craft, means coupled between said transmitter means and said antenna for responding to said transmitter means to transmit pulses of energy and responsive to energy reflected from the objects to develop sum and difference signals having amplitude characteristics representative of the angle of energy return in an elevation plane, said sum signal having a substantially maximum amplitude from energy received from objects on the boresight axis, said difference signal having a substantially minimum amplitude from energy received from objects on said boresight axis, comparison means coupled to said antenna means for developing a control signal at a time representative of the simultaneous occurrence of the substantially minimum amplitude of said difference signal and the substantially maximum amplitude of said sum signal, and display means coupled to said transmitter means and to said comparison means for responding to said control signal to develop an indication of the slant range and azimuth position of objects on said boresight axis, said display means having a reference line indicating the predetermined slant range from said craft to said clearance plane on said boresight axis to provide an indication of the position of said objects with respect to said moving craft.

9. A system for indicating the slant range of objects below the velocity vector of a craft and relative to a predetermined range to a clearance plane at a predetermined distance below the craft comprising transmitter means, azimuth scan monopulse antenna means coupled to said transmitter means, said antenna means having a boresight axis at a predetermined depression angle relative to said clearance plane for scanning through a predetermined azimuth angle at a predetermined constant angle below the velocity vector, said boresight axis defining in space a range arc in said clearance plane, said clearance plane being parallel to said velocity vector, said antenna means responding to received energy to develop a difference signal having amplitude characteristics varying with the elevation angle of energy return and having a minimum amplitude at times including the time of energy return on said boresight axis, said antenna means responding to intercepted energy to develop a sum signal having amplitude characteristics varying with the elevation angle of energy return and having a substantially large amplitude at the time of energy return on the boresight axis, signal forming means coupled to said antenna means and responsive to said sum and difference signals to develop a control signal at the time of energy return on said boresight axis, and indicating means coupled to said transmitter means and to said signal forming means for responding to said control signal to develop an indication of the slant range of objects on said boresight axis, said display means having a reference arc for indicating the position of objects along said boresight axis relative to said clearance plane.

References Cited by the Examiner

UNITED STATES PATENTS

| | | | |
|---|---|---|---|
| 2,456,666 | 12/48 | Agate et al. | 343—118 |
| 2,630,283 | 3/53 | Hanson | 343—112.4 |
| 2,687,520 | 8/54 | Fox et al. | 343—16 |
| 2,698,401 | 12/54 | Korelich | 343—5 |
| 2,712,647 | 7/55 | Sherwin | 343—5 |
| 2,810,126 | 10/57 | Bartelink | 343—5 |
| 2,821,703 | 1/58 | Knauss | 343—5 |
| 2,965,894 | 12/60 | Sweeney | 343—112.4 |
| 3,067,418 | 12/62 | Coop | 343—11 |
| 3,085,243 | 4/63 | Bond | 343—7 |

CHESTER L. JUSTUS, *Primary Examiner.*